Dec. 4, 1928.  
G. A. RICHTER  
1,694,231  
PROCESS OF MAKING RAW CALCIUM BISULPHITE DIGESTING LIQUOR  
Filed April 23, 1925
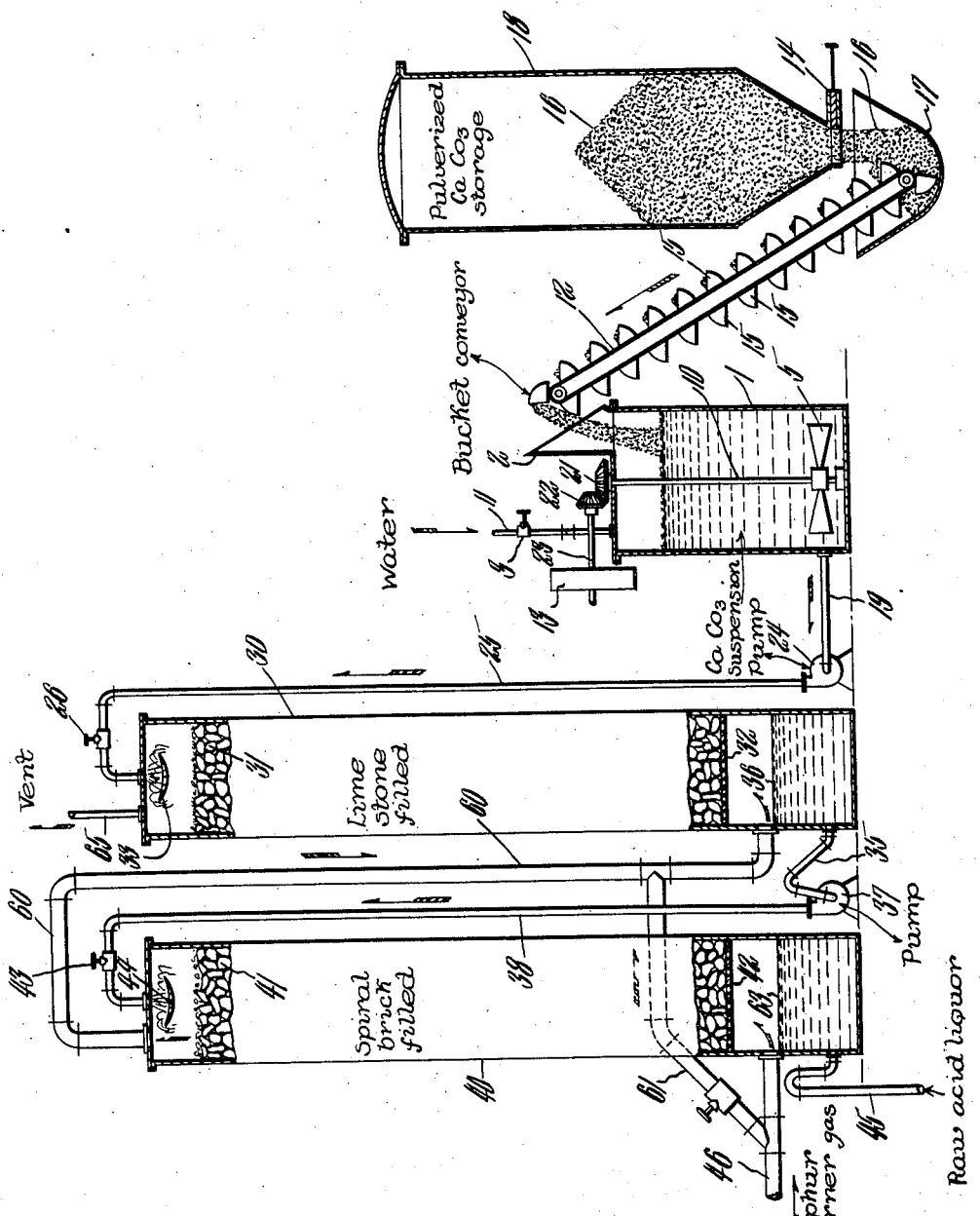

Patented Dec. 4, 1928.

1,694,231

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF MAKING RAW CALCIUM-BISULPHITE DIGESTING LIQUOR.

Application filed April 23, 1925. Serial No. 25,265.

This invention relates to the production of raw calcium bisulphite liquor such as is employed for the digestion of wood chips in the manufacture of sulphite pulp, and has for its object to produce a raw digesting liquor which contains a uniform amount of combined $SO_2$ and is rich in free $SO_2$, and to provide an effective control of the free and the combined $SO_2$ in the production of the raw acid liquor.

This object is attained in a manner which will be readily understood from the following description of this invention, when taken in connection with the accompanying drawing, which is a more or less diagrammatic and conventional representation of one form of apparatus with which the invention may be practised; but it will be understood that the construction of the apparatus is susceptible of many variations.

In carrying out this object, the preparation of what I term the raw acid liquor may be considered as being divided into two separate stages. The first stage consists of the preparation of a liquor which has a predetermined combined $SO_2$ content, and comprises mixing water with pulverulent limestone, so as to form a substantially uniform suspension, and then passing the suspension through a tower filled with dolomite or limestone rock in counter-current contact with sulphur dioxide gas, to ensure a constant or uniform combined $SO_2$ content. The second stage consists of the fortification or the enrichment of the liquor obtained from the limestone-filled tower, to a higher degree of free $SO_2$ content, and comprises subjecting the liquor obtained from the first tower to the action of sulphur dioxide, by passing it through a tower filled with surface or interstitial material in counter-current flow to the sulphur dioxide.

Before proceeding to a description of the apparatus, it may be stated that ordinarily in the production of an acid sulphite liquor, sulphur or sulphur-bearing material is burned for the production of sulphur dioxide, and the burner gases so-called resulting from this combustion are caused to pass through limestone-filled towers in series, through which water is passed in counter-current contact thereto, for the formation of a raw acid liquor. The raw acid liquor thus produced is subsequently strengthened by the addition of more concentrated sulphur dioxide gas, to bring it to a point at which it is ready for use in the digesters for the liberation of fiber and the production of sulphite pulp.

The present invention relates only to the production of a raw acid liquor. The sulphur dioxide employed in the preparation of the raw acid liquor is delivered from a sulphur burner into the second-stage tower, and the tail gas, i. e., that portion which is not absorbed in the fortification of the liquor in this tower, then passes into the first-stage tower for reaction with the limestone suspension in water and the lime-stone rock.

On the accompanying drawing, 1 represents a mixing tank for making up the limestone suspension into which the pulverulent limestone may be introduced as by a variable-speed bucket conveyor 12 (driven and manually controlled by suitable means not shown), through a hopper or a feed opening as at 2. Each bucket 15 of the conveyor 12 dips into a trough 17 containing a mass of the pulverulent lime-bearing material 16, and picks up approximately a fixed quantity of such material, which is conveyed to and then dumped into the tank 1 through the feed opening 2, as shown. The amount of pulverulent material delivered into the tank 1 at any time may be varied by varying the speed of the conveyor 2. The trough 17 is supplied with the material 16 from a storage bin 18,—the flow of material thereinto being controllable by a sliding gate valve 14. The rate of feed of the pulverulent limestone into the tank 1, i. e., the speed of the bucket conveyor 12, is maintained at a constant rate, depending upon the strength of suspension which it is necessary to maintain at any particular time in order to produce a certain combined $SO_2$ content in the finished liquor, as will further be described hereinafter. Water is introduced into the tank 1 through a pipe line 11, valved as at 3, at the required rate, and is intimately mixed with the pulverulent limestone, by a stirrer or agitator 5, located at the lower end of the tank 1, to form a substantially uniform suspension. The agitator is supported by a shaft shown conventionally at 10, to which rotation may be imparted by any suitable power means. Rotation of the shaft 10 is effected by a belt pulley 13, affixed to a shaft 23, at one end of which is carried a gear 22, meshing with a gear 21 affixed at one end of the stirrer shaft 10.

The uniform suspension produced in the tank 1 is delivered therefrom, through an outlet pipe 19 located near its bottom, by a manually-controlled variable-speed pump 24 through a pipe line 25, valved as at 26, into the top portion of a tower 30, in which the first stage of the acid liquor preparation is carried out. The amount of suspension delivered into the tower 30 at any time may be varied by varying the speed of the pump. The tower 30 is constructed of the usual acid-resistant materials, such as wood or concrete. It is almost completely filled with chunks of limestone rock 31, varying from about 6 inches to 30 inches in diameter, which are supported by a perforated or grid partition 32 located near the base portion of the tower.

The suspension is distributed more or less uniformly over the limestone rock material by a spray or distributor, as at 33, and as it descends through the tower over the large surface of the limestone rock in multitudinous streamlets, it contacts with sulphur dioxide gas rising in counter-current flow thereto through the tower. The sulphur dioxide gas is delivered into the tower 30 near its lower end, through a gas conduit 60, from the top portion of a tower 40 in which the fortification or further acidulation of the liquor produced in the first-stage tower 30 is carried out. The sulphur dioxide gas is absorbed by the water during its downward passage through the tower 30, forming sulphurous acid, and simultaneously the sulphurous acid formed reacts with the limestone rock in the tower over its large reaction surface, and with the pulverulent limestone in suspension, forming free and combined $SO_2$ in all parts of the tower. By the expression "free $SO_2$", I mean $SO_2$ present in neutralizable condition, i. e., in the form of sulphurous acid or dissolved $SO_2$, or in the form of calcium bisulphite, wherein half the $SO_2$ is in free condition. The limestone in suspenson reacts rapidly with the acid solution, due to the relatively large surface exposed for reaction in proportion to its weight; and is entirely consumed by reaction with the sulphurous acid in its downward passage through the tower,—a clear calcium bisulphite liquor falling from the partition 32 and forming a pond 36 at the bottom of the tower.

The liquor in the pond 36 contains a predetermined combined $SO^2$ content, but is weak in free $SO_2$, so that it must be fortified or further acidulated to the desired free $SO_2$ content, which, as has already been stated, is effected in the second-stage tower 40. Accordingly, the liquor is withdrawn from the pond 36 by a pump 37 through a pipe 35, and is delivered through the pipe 38, valved as at 43, to the top of the tower 40, which is almost completely filled with inert surface or interstitial material 41, such as spiral brick or field rock. The tower 40 is similar in construction to and of about the same size as the tower 30, and is also provided with a grid or perforated partition 42 at its base portion for supporting the inert interstitial material 41. The acid liquor is distributed over the surface material as by the distributor 44, and slowly percolates down through the tower in thin films, through many interrupted and tortuous passages, so that a very large surface of liquor is exposed for a relatively long period of time to the action of sulphur dioxide flowing upwardly through the tower in counter-current contact thereto. The liquor dissolves the sulphur dioxide during its downward passage through the tower and is fortified to its maximum free $SO_2$ content, which depends on the temperature of the liquor produced in this tower and the partial pressure of the sulphur dioxide in the burner gas introduced into the tower. The fortified raw acid liquor, which now contains a maximum free $SO_2$ content, and the desired combined $SO_2$ content, falls to the bottom of the tower, forming a pond 63, and is conducted through an outlet pipe 45 to a storage tank (not shown), from which it is drawn for further acidulation by gas containing a high percentage of sulphur dioxide, such as relief gas and recovered blow pit gas. The sulphur dioxide is delivered into the tower 40 near its lower end, through a conduit 46, under sufficient pressure (produced by a fan blower or other means not shown) to maintain a flow of gas through the entire system. In order to operate the system at low capacities, as will subsequently be more fully described, provision is made to by-pass a certain amount of burner gas from the conduit 46 into the tower 30, if such is necessary, through a conduit 61. A vent pipe 65 at the top of the tower 30 provides for the exit of inert and unabsorbed gases which collect at the end of the system.

The following specific example, which involves features that arise in actual practice, will give a clearer understanding as to how the system hereinbefore outlined is constructed and operated so as to maintain a uniform combined $SO_2$ content and a high free $SO_2$ content in the raw acid liquor. For example, let us assume it is desired to produce a raw calcium bisulphite liquor containing, say, 1% combined $SO_2$ (the combined $SO_2$ strength of 1% representing the usual maximum strength in calcium bisulphite liquors employed for the digestion of wood chips in the production of sulphite pulp) and a free $SO_2$ content of, say, 2.5%. To produce a liquor of this strength, the usual limestone-filled tower 30 is of a size such that under the optimum conditions met with in practice for dissolving limestone from the dolomite or rock limestone material in the tower, i. e., at a time when the available water employed in the preparation of the liquor is at its highest seasonable temperature, if only water were passed in counter-current flow to sulphur dioxide through the tower, a calcium bisulphite liquor containing less than the desired combined $SO_2$ content would result. Under such conditions, the tower ordinarily produces a liquor containing, say, about 0.8% combined $SO_2$. Ordinarily, therefore, according to prior practice, two limestone towers are arranged in series, so that the liquor after acidulation with the tail gas from one tower is passed to the second tower, where it meets the incoming burner gas, and its strength of combined $SO_2$ is increased. In accordance with the present invention, however, where but one limestone tower is used, the addition of a certain amount of the rapidly reacting pulverulent limestone to the water passed through the tower is necessary at all times and ensures the desired maximum combined $SO_2$ content in the liquor delivered therefrom.

The strength and the amount of the suspension fed into the tower 30 is regulated or controlled to maintain the combined $SO_2$ content of the liquor leaving the bottom of the tower at 1.0%. The liquor produced is free from undissolved pulverulent limestone and contains 1% to 1.5% free $SO_2$. The clear liquor is then pumped to the fortifying tower 40, wherein it is contacted with burner gas and is fortified to its maximum free $SO_2$ content,—the maximum free $SO_2$ content depending upon the temperature of the finished raw acid liquor and the concentration of burner gas fed into the tower.

To ensure more complete control under certain conditions, as when the liquor-making system is operated at lower than normal capacity, a certain amount of burner gas may be by-passed into the first-stage tower 30, through the by-pass line 61, to permit the introduction of the desired quantity of $SO_2$ of higher concentration thereinto. Ordinarily the amount of $SO_2$ delivered with the tail gas from tower 40 to the tower 30 is sufficient to give the desired combined $SO_2$ content of liquor; but at low capacities, if burner gas were not by-passed to the weak tower, the liquor passed into the second-stage tower 40 would absorb a major portion of the sulphur dioxide, and so cut down the $SO_2$ content of the tail gas leaving the top of the tower 40 that a 1% combined $SO_2$ content in the liquor could not be obtained in the tower 30. Such a condition would necessarily call for the introduction of an additional amount of limestone in suspension with the water introduced into the tower 30, so that the liquor leaving the weak tower would become turbid with unreacted pulverulent limestone and calcium monosulphite, which would be carried along into the tower 40 where it would react with the $SO_2$. Such a condition is obviously undesirable, inasmuch as it might result in plugging the interstices in the tower 40 with calcium monosulphite. The system is arranged and controlled, however, so that the desired amount of lime-bearing material is completely dissolved in the liquor and the latter is clear when it is introduced for fortification into the tower 40.

The advantages of the process hereinbefore described will be immediately apparent to those skilled in the art, and offers advantages over many of the processes heretofore practised. These prior processes have also aimed at the production of a uniform raw acid liquor,—that is a liquor which has a uniform combined $SO_2$ content, and as large a free $SO_2$ content as possible, and each process has certain advantages and disadvantages. This invention offers the advantages incident to these prior processes, and does not possess the disadvantages inherent thereto.

For example, as has been stated hereinbefore, one very common and economical system employs two towers, both filled with limestone rock,—the water being circulated in series in counter-current flow to the $SO_2$ through the towers. The objection to this system is that the control of the combined and free $SO_2$ content is lacking, and is dependent to a great degree upon the temperature of the water available in making up the liquor. For instance, in the summer time, with only warm water available, there is a tendency to produce a raw acid liquor too high in combined $SO_2$, and not high enough in free $SO_2$. If the percentage of sulphur dioxide fed from the burners is increased in order to increase the free $SO_2$ content of the liquor to approach theoretical saturation at the given temperature, difficulty is immediately encountered, because there is a corresponding increase in combined $SO_2$, which interferes with the subsequent cooking operations. In order to avoid this difficulty, it is the common practice to operate the raw liquor producing system in such way as to produce the desired combined $SO_2$, regardless of the free $SO_2$ content. In some such cases, a digesting bisulphite liquor is produced containing about 3½% free $SO_2$, where, had it been possible to produce a higher free $SO_2$ content in the raw acid liquor, a cooking liquor containing at least 4% free $SO_2$ might have been prepared. In the winter time, difficulty of the opposite sort is encountered. Due to cold water entering the raw liquor-making system, the rate of reaction between the dissolved sulphur dioxide and the limestone is lowered to such an extent that it is very difficult to obtain a combined $SO_2$ content high enough for satisfactory digesting purposes. This difficulty is usually met in one of two ways: either the system is operated at a lower capacity so as to allow a longer time of contact and reaction between the acid liquor and the limestone, or the entering water is heated by steam in order to increase the rate of reaction between the limestone and the sulphurous acid solution formed in the tower to produce an acid of the desired combined $SO_2$ content. Such two-tower limestone systems are often forced to produce a raw acid liquor which contains more than the required amount of free $SO_2$ during the winter months, because of the inability to heat the water sufficiently to increase the combined $SO_2$ content, i. e., in such cases the practice is to use more burner gas than is necessary in order to produce the desired combined $SO_2$ content,—thereby increasing the free $SO_2$ content of the raw acid liquor beyond the desired point.

The system, as has been described, allows the raw acid liquor system to be operated in such a manner that temperature changes may be counterbalanced or compensated for by regulating the amount of pulverized limestone fed in suspension with the water. In other words, the finely divided limestone is used as a balancing material. The system described is simple and offers advantages over a system where only pulverized calcium-bearing compounds are used in the preparation of the raw acid liquor, because obviously the preparation of an acid liquor with only such materials is more expensive.

By the word "limestone," as employed in the specification and in the appended claims, I mean calcium carbonate occurring substantially alone in limestone known as "calcite" or occurring together with magnesium carbonate in limestone known as "dolomite".

What I claim is:

1. That step in the process of making calcium bisulphite cooking liquor, which comprises passing a suspension of finely divided limestone in water in contact with, and in counter-flow to, sulphur dioxide, through a confined mass of limestone rock.

2. A process of making calcium bisulphite cooking liquor, which comprises passing a suspension of finely divided limestone in water in contact with, and in counter-current flow to, sulphur dioxide, through a confined mass of limestone rock, thereby causing a reaction between the calcium-bearing materials, the water and the sulphur dioxide to form calcium bisulphite, and then further acidulating the product of reaction with sulphur dioxide.

3. A process of making a calcium bisulphite cooking liquor, which comprises passing sulphur dioxide successively through a confined mass of inert interstitial material and a confined mass of limestone rock; passing water containing finely divided limestone in suspension in the opposite direction, first through the mass of limestone rock, whereby the water reacts with the sulphur dioxide and the calcium-bearing materials to form a calcium bisulphite solution, and then through the mass of inert interstitial material, whereby the free $SO_2$ content of the liquor is further increased.

4. That step in the process of making a calcium bisulphite cooking liquor, which comprises passing water containing finely divided limestone in suspension through a confined mass of limestone rock in contact with, and counter-current to, sulphur dioxide, whereby the water reacts with the sulphur dioxide and the lime-bearing materials to form a calcium bisulphite liquor,—the amount of calcium-bearing material in suspension ensuring a predetermined combined $SO_2$ content in the resulting bisulphite liquor.

5. A process of making a calcium bisulphite cooking liquor, which comprises passing water containing finely divided limestone in suspension therein through a confined mass of limestone rock in contact with, and in counter-current flow to, sulphur dioxide, whereby the water reacts with the sulphur dioxide and the lime-bearing materials to form a calcium bisulphite liquor,—said water containing an amount of calcium-bearing material in suspension to ensure a combined $SO_2$ content of about 1% in the resulting bisulphite liquor; and further acidulating said liquor to a desired free $SO_2$ content by passing it through a confined mass of interstitial material in relatively thin films in counter-current flow to and in contact with sulphur dioxide.

6. A process of making calcium bisulphite cooking liquor, which comprises passing water containing finely divided limestone in suspension in contact with, and in counter-flow to, sulphur dioxide through a confined mass of limestone rock, regulating the amount of pulverulent material in suspension and the concentration of the sulphur dioxide so that a substantially clear calcium bisulphite liquor is produced, and further acidulating said liquor to further increase its free $SO_2$ content.

In testimony whereof I have affixed my signature.

GEORGE A. RICHTER.